(12) United States Patent
New

(10) Patent No.: US 11,864,551 B1
(45) Date of Patent: Jan. 9, 2024

(54) AERIAL WILDLIFE SURVEY AND WOUNDED GAME ANIMAL TRACKING PROCESS FOR COMPLETING ACCURATE AERIAL WILDLIFE SURVEYS BY MACHINE LEARNING AND AI-SUPPORTED FILTERING OF NON-RELEVANT INFORMATION TO COUNT AND REPORT ON SPECIFIC TARGETED ASPECTS OF WILDLIFE

(71) Applicant: Jarret Mason New, Wimberley, TX (US)

(72) Inventor: Jarret Mason New, Wimberley, TX (US)

( * ) Notice: Subject to any disclaimer, the term of this patent is extended or adjusted under 35 U.S.C. 154(b) by 357 days.

(21) Appl. No.: 17/116,897

(22) Filed: Dec. 9, 2020

Related U.S. Application Data

(60) Provisional application No. 62/946,794, filed on Dec. 11, 2019.

(51) Int. Cl.
*A01M 31/00* (2006.01)
*A01K 29/00* (2006.01)
(Continued)

(52) U.S. Cl.
CPC ......... *A01M 31/002* (2013.01); *A01K 29/005* (2013.01); *B64C 39/024* (2013.01); *G06N 20/00* (2019.01); *G06T 5/30* (2013.01); *G06T 7/74* (2017.01); *G06V 20/17* (2022.01); *G06V 20/46* (2022.01); *G06V 40/10* (2022.01); *B64U 2101/30* (2023.01); *G06T 2207/10036* (2013.01); *G06T 2207/20081* (2013.01); *G06T 2207/30242* (2013.01); *G06V 20/194* (2022.01)

(58) Field of Classification Search
CPC .......... A01M 31/002; G06T 7/74; G06T 5/30; G06T 2207/10036; G06T 2207/20081; G06T 2207/30242; G06N 20/00; G06V 20/17; G06V 20/194; G06V 20/46; G06V 20/52; G06V 40/10; A01K 29/005; B64C 39/024; B64U 2101/30; G06F 16/51; G06F 16/587
See application file for complete search history.

(56) References Cited

U.S. PATENT DOCUMENTS

| | | | |
|---|---|---|---|
| 11,134,221 B1* | 9/2021 | Brown | H04N 5/2621 |
| 2011/0081043 A1* | 4/2011 | Sabol | G06T 7/254 |
| | | | 382/103 |

(Continued)

*Primary Examiner* — Orlando Bousono
(74) *Attorney, Agent, or Firm* — Plager Schack LLP; Mark H. Plager; Stephen Hallberg

(57) ABSTRACT

A machine learning aerial wildlife survey and wounded game animal tracking process for completing accurate aerial wildlife surveys and tracking wounded game animals by machine learning and AI-supported filtering of non-relevant information is disclosed. The machine learning AI aerial wildlife survey and wounded game animal tracking process utilizes aerial vehicles, such as drones, to conduct wildlife surveys. Drones are quieter than helicopters and, therefore, have a diminished stress impact on the surrounding wildlife. In some embodiments, the machine learning AI aerial wildlife survey and wounded game animal tracking process utilizes machine learning AI filters to filter out trees and underbrush to accurately visualize wildlife and accurately count wild game.

9 Claims, 3 Drawing Sheets

(51) Int. Cl.
  *G06T 7/73*      (2017.01)
  *G06N 20/00*     (2019.01)
  *B64C 39/02*     (2023.01)
  *G06T 5/30*      (2006.01)
  *G06V 20/40*     (2022.01)
  *G06V 40/10*     (2022.01)
  *G06V 20/17*     (2022.01)
  *G06V 20/10*     (2022.01)
  *B64U 101/30*    (2023.01)

(56) References Cited

U.S. PATENT DOCUMENTS

2015/0030234 A1* 1/2015 Lenseigne ............... G06T 7/507
                                                    382/154
2017/0189906 A1* 7/2017 Moll ................. B01L 3/502746
2017/0202185 A1* 7/2017 Trumbull ........... A61B 5/14507
2019/0392211 A1* 12/2019 Hartman ................ G06V 20/20

* cited by examiner

AERIAL WILDLIFE SURVEY AND WOUNDED GAME ANIMAL TRACKING PROCESS FOR COMPLETING ACCURATE AERIAL WILDLIFE SURVEYS BY MACHINE LEARNING AND AI-SUPPORTED FILTERING OF NON-RELEVANT INFORMATION TO COUNT AND REPORT ON SPECIFIC TARGETED ASPECTS OF WILDLIFE

CLAIM OF BENEFIT TO PRIOR APPLICATION

This application claims benefit to U.S. Provisional Patent Application 62/946,794, entitled "Machine Learning Application for the purpose of wildlife surveys and tracking wounded game animals," filed Dec. 11, 2019. The U.S. Provisional Patent Application 62/946,794 is incorporated herein by reference.

BACKGROUND

Embodiments of the invention described in this specification relate generally to animal tracking and surveying, and more particularly, to a machine learning artificial intelligence ("AI") aerial wildlife survey and wounded game animal tracking process for completing accurate aerial wildlife surveys by machine learning and AI-supported filtering of non-relevant information (e.g., trees, brush, localized heat from drone operation, etc.) to count and report on specific targeted aspects of wildlife (such as tracking wounded game animals and general purpose wildlife surveys of a defined geographic space).

The United States fish and wildlife services and each states parks and wildlife department require wildlife surveys, currently the surveys are conducted by spotlighting from vehicles and or the use of helicopters and manual counts which creates added stress on the wildlife. Texas parks and Wildlife, for example, requires landowners with Managed Lands Deer ("MLD") permits to carry out deer surveys annually to maintain their MLD permits. Another issue is finding wounded game animals which is currently carried out by trackers or trackers with tracking dogs both of which are extremely labor intensive.

Currently existing methods typically involve the use of helicopters to fly over and complete wildlife surveys. However, helicopters are noisy and add stress to the wildlife while flying overhead. Furthermore, helicopters are costly to own or rent. From a budget perspective, this makes helicopters a poor choice when carrying out a survey. Another existing method involves spotlighting from a vehicle to approximate animal counts for a wildlife survey. However, spotlighting is highly labor intensive, and the results are generally considered to be prone to human error.

Therefore, what is needed is a way to conduct wildlife surveys with less stress impact on the wildlife while also filtering out trees and underbrush to accurately see wildlife and accurately count wild game animals.

BRIEF DESCRIPTION

A novel machine learning AI aerial wildlife survey and wounded game animal tracking process is disclosed for completing accurate aerial wildlife surveys by machine learning and AI-supported filtering of non-relevant information to count and report on specific targeted aspects of wildlife, such as tracking wounded game animals and general purpose wildlife surveys of a defined geographic space.

In some embodiments, the machine learning AI aerial wildlife survey and wounded game animal tracking process utilizes drones to conduct wildlife surveys because drones are quieter than helicopters and, therefore, have a diminished stress impact on the surrounding wildlife.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
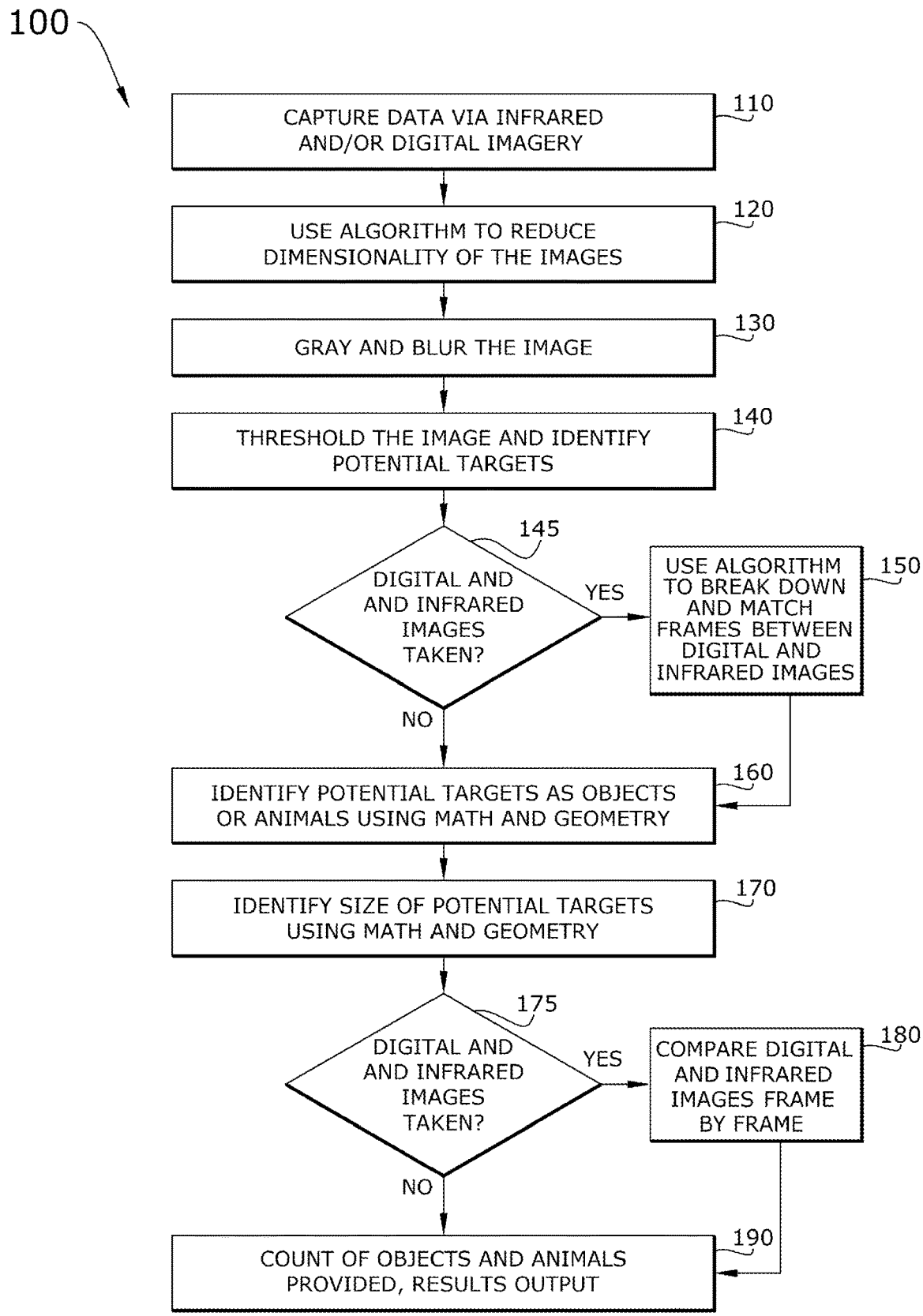
FIG. 1 conceptually illustrates an overall machine learning AI aerial wildlife survey and wounded game animal tracking process in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments include a machine learning AI aerial wildlife survey and wounded game animal tracking process for completing accurate aerial wildlife surveys by machine learning and AI-supported filtering of non-relevant information to count and report on specific targeted aspects of wildlife. In some embodiments, the machine learning AI aerial wildlife survey and wounded game animal tracking process utilizes machine learning AI filters to filter out the non-relevant information in order to accurately visualize wildlife and accurately count wild game. Examples of non-relevant information include, without limitation, trees, brush, underbrush, vegetative canopy, localized heat from drone operation, etc. In some embodiments, the machine learning AI aerial wildlife survey and wounded game animal tracking process utilizes drones to conduct wildlife surveys or other activities, such as tracking wounded game animals or general purpose wildlife surveys over a defined geographic space. Since aerial drones are quieter than helicopters, there is a diminished stress impact on the surrounding wildlife.

Embodiments of the machine learning AI aerial wildlife survey and wounded game animal tracking process described in this specification solve the problems noted above by using machine learning-based AI processing of video coupled with thermal imagery and or digital imagery, such that the process is capable of conducting wildlife surveys with less stress to the animals by the use of drones or helicopters from a higher than typical altitude maintained to conduct these surveys.

Embodiments of the machine learning AI aerial wildlife survey and wounded game animal tracking process described in this specification differ from and improve upon currently existing options. In particular, some embodiments differ by using thermal and machine learning to filter out image details that obscure the identification of wildlife, such as tree canopy and brush. The machine learning AI aerial wildlife survey and wounded game animal tracking process does this filtering in tandem with other processing to algorithmically recognize and count wildlife. Conventionally, the current methods to conduct surveys are inaccurate due to the brush cover and the stress it adds on the wildlife. For instance, an aerially captured video would not provide as detailed or accurate a count of wildlife, since tree cover and brush would obscure or hide wildlife from the video analysis. In contrast, the machine learning AI aerial wildlife survey and wounded game animal tracking process is a better option than anything else currently in the field, because it adds less stress to the wildlife and provides a more accurate survey through the use of thermal and machine learning to filter out the tree canopy, brush, etc., and thereby recognize/identify and count wildlife. Furthermore, the machine learning AI aerial wildlife survey and wounded game animal tracking process is not limited to wildlife surveys since is it capable of producing many useful reports in any industry where objects or living beings can be detected autonomously through machine learning and then counted through machine learning in which a report of that information is valuable.

The machine learning AI aerial wildlife survey and wounded game animal tracking process of the present disclosure may be comprised of the following elements. This list of possible constituent elements is intended to be exemplary only and it is not intended that this list be used to limit the machine learning AI aerial wildlife survey and wounded game animal tracking process of the present application to just these elements. Persons having ordinary skill in the art relevant to the present disclosure may understand there to be equivalent elements that may be substituted within the present disclosure without changing the essential function or operation of the machine learning AI aerial wildlife survey and wounded game animal tracking process.

1. Aerial Technology utilized to collect data (e.g., drone with video camera)
2. Data is transferred
3. Data is cleansed
4. Data is Processed
5. Results are generated The various elements of the machine learning AI aerial wildlife survey and wounded game animal tracking process of the present disclosure may be related in the following exemplary fashion. The aerial technology (such as a drone with a video camera) is used to fly over the specified area to capture video. The video is captured as thermal imagery, standard digital imagery, or both thermal video capture and digital video capture. When both thermal and standard digital (visual) video capture is enabled, the thermal and digital videos may be combined as separate layers in a composite video, as a post processing step that is performed either by the drone's onboard processor (which is, therefore, nearly in realtime with the actual live ongoing video capturing) or done by a ground processing unit after the drone lands and completes a data dump, by which the collected data is transferred to the ground processing unit (such as a computing device with hard drive storage and processing software/program). The collected data is either extracted manually or automatically transferred when in range (e.g., wirelessly via Bluetooth, mobile signal transfer, WiFi, etc.). The data is cleansed by using machine learning filters. The cleansed/filtered data is then processed to count wildlife. Rounding out the process, a report is generated to supply the results.

By way of example, FIG. 1 conceptually illustrates an overall machine learning AI aerial wildlife survey and wounded game animal tracking process 100 in some embodiments. As shown in this figure, the overall machine learning AI aerial wildlife survey and wounded game animal tracking process 100 starts by an aerial vehicle (such as a drone) capturing data via infrared ("IR") and/or digital imagery (at 110). The aerial vehicle may be a drone, for example, which is outfitted with an IR camera that is able to capture IR data of an area over which the drone passes. The aerial vehicle may also have a video camera that captures digital imagery in the human-visible light spectrum. In some cases, a combined IR/video camera device is incorporated into the drone aerial vehicle. Typically, the drone would also include media, such as a flash storage option (e.g., USB flash drive, SD flash memory, etc.) or a solid state storage device ("SSD"), on which to record the captured IR and/or digital imagery. In some embodiments, the drone may include wireless transceiver device(s) which are configured to transmit the captured data in realtime to a ground computing device or a cloud/web server that hosts a machine learning AI aerial wildlife survey and wounded game animal tracking portal as a cloud application service.

In some embodiments, the overall machine learning AI aerial wildlife survey and wounded game animal tracking process 100 cleanses the captured data by using an algorithm to reduce the dimensionality of the captured images or video frames (at 120). Next, the overall machine learning AI aerial wildlife survey and wounded game animal tracking process 100 attempts to make each captured image a more viewable image by graying and blurring the captured image (at 130). The overall machine learning AI aerial wildlife survey and wounded game animal tracking process 100 then works with temperature (color) values to provide a temperature threshold that will be used for identifying and marking potential targets (at 140). A potential target may be several wildlife game animals or a single wounded animal to be tracked, etc. Next, the overall machine learning AI aerial wildlife survey and wounded game animal tracking process 100 determines (at 145) whether both digital and IR images have been captured. When the captured data does not include both digital and IR images or frames, the overall machine learning AI aerial wildlife survey and wounded game animal tracking process 100 proceeds ahead to identify potential targets and distinguish between objects and animals using math and geometry (at 160). In some embodiments, identifying the potential targets (at 160) involves applying a silhouette around the potential targets marked according to the temperature threshold (at 140), and then utilizing math and geometry with respect to the potential targets to identify the type of object or animal as detected.

On the other hand, when both digital and IR images have been captured, the overall machine learning AI aerial wildlife survey and wounded game animal tracking process 100 uses an algorithm to break down and match frames between the digital and IR images (at 150). The algorithm works by capturing and linking the corresponding frames in the digital video (standard color or human visible light spectrum images) to the corresponding time-synchronized image frames in thermal (IR) video imagery by way of an algorithm that breaks down the frame rate of each separate video, matches frame to frame across the separate videos and makes adjustments when different frame rates are used, thereby providing an effective way to find the corresponding digital frames that match to the IR frames in time-synchronized manner. Then the overall machine learning AI aerial wildlife survey and wounded game animal tracking process 100 proceeds to the step noted above for identifying the potential targets and distinguishing between objects and animals using math and geometry (at 160).

In some embodiments, the overall machine learning AI aerial wildlife survey and wounded game animal tracking process 100 then identifies the sizes of potential targets (at 170), again using math and geometry to determine those sizes. Specifically, the overall machine learning AI aerial wildlife survey and wounded game animal tracking process 100 applies additional math to calculate the size of each potential target—whether an animal or an object. The additional math at this step (at 170) involves using the known image pixel size (as provided by camera specifications and settings) in relation to the distance from which the image was taken, to verify the type of animal or object and subsets. Next, the overall machine learning AI aerial wildlife survey and wounded game animal tracking process 100 again determines (at 175) whether both digital and IR images have been captured. When the captured image data does not include both IR image data and digital imagery (video captured in color spectrum visible to human eyes), then the overall machine learning AI aerial wildlife survey and wounded game animal tracking process 100 proceeds forward to a step for counting the objects and animals and providing the count of objects and animals as resulting output data (at 190).

On the other hand, when IR image data has been captured alongside digital imagery, the overall machine learning AI aerial wildlife survey and wounded game animal tracking process 100 compares the digital and IR images frame by frame (at 180). Specifically, the corresponding IR frames with verified targets are compared and contrasted to the IR data via either a manual (human) process or via a classification algorithm that automatically processes the corresponding digital images. In some embodiments, this is done to verify the accuracy of the process each time to increase the accuracy of the application. After completing the frame-by-frame comparison of digital and IR images, the overall machine learning AI aerial wildlife survey and wounded game animal tracking process 100 proceeds finally to the step for counting the objects and animals and providing the resulting output data (at 190), as noted above. Then the overall machine learning AI aerial wildlife survey and wounded game animal tracking process 100 ends.

The machine learning AI aerial wildlife survey and wounded game animal tracking process of the present disclosure generally works by cleansing (filtering) the thermal and/or digital imagery from the captured video(s). Then the machine learning AI aerial wildlife survey and wounded game animal tracking process recognizes or detects the wildlife. The recognized/detected wildlife is then counted, so that there are accurate counts of the identified wildlife and the respective numbers of each. The type of aviation hardware (e.g., aerial drone, helicopter, satellite, etc.) and the type of imagery (e.g., thermal, standard visual imagery, etc.) captured and used is dependent on the areas to be surveyed and the tracts of land and the allotted time for the surveys to be completed.

To make the machine learning AI aerial wildlife survey and wounded game animal tracking process of the present disclosure, a person would develop software to process video or other imagery captured by the aerial vehicle (e.g., drone, helicopter, satellite, etc.), where the video is either or both of thermal imagery/video and/or digital imagery/video. The software would incorporate modules or sub-processes to perform the machine learning/AI aspects for filtering (e.g., machine learning algorithms that are implemented into the software or come as plug-ins to integrate into the program). The machine learning/AI module or sub-processing aspects filter out image elements that may be captured, such as the trees and other brush which may be covering the wildlife in need of survey. In addition to the machine learning/AI coding and incorporation into the overall system/program, the person would also code another set of algorithms into the software application which identify a specified type of wild life, then input another algorithm which counts the specified wildlife. It is possible to enhance the system by coding the program for processing of laser technology-based data or acoustic data. This might include, for example, enhanced laser technology and/or sound recognition tailored to specific wildlife. In some embodiments, double cleansing (or double filtering) can be completed by performing a second data cleansing pass after the data has been cleansed after the first initial data processing step to count and detect wildlife—with the second pass focusing on improving the detection process by re-cleansing (filtering again to catch any trees or brush missed in the first pass) and re-processing the data again as the results improve.

In some embodiments, a user would interact with software or a program implementation of the machine learning AI aerial wildlife survey and wounded game animal tracking process to solve the issue of data accuracy in wildlife surveys. The user would install the software/program on a computing device, such as a smart camera, a drone being utilized to conduct a wildlife survey in realtime, a smartphone with onboard camera, etc., and may either perform the data dump to a separate computing device (e.g., laptop computer at drone launch and landing site, where the laptop or other computing device includes storage, processor, memory, etc., communication via cable or wireless, etc.) or perform on the same computing device (e.g., smart camera with hard drive video storage, a processing unit, memory (RAM), and/or a video processing unit, or smartphone similarly outfitted with onboard camera and processor/memory, etc.), or even a portal (e.g., a software-as-service application portal (or "SaaS cloud service") with sufficient hardware/software resources similar to those noted above), and then after filtering and processing is completed, results are generated and provided (or after submitting the information to the portal (or SaaS cloud service), post processing is performed and results are generated, provided, or otherwise granted).

Figure 2:
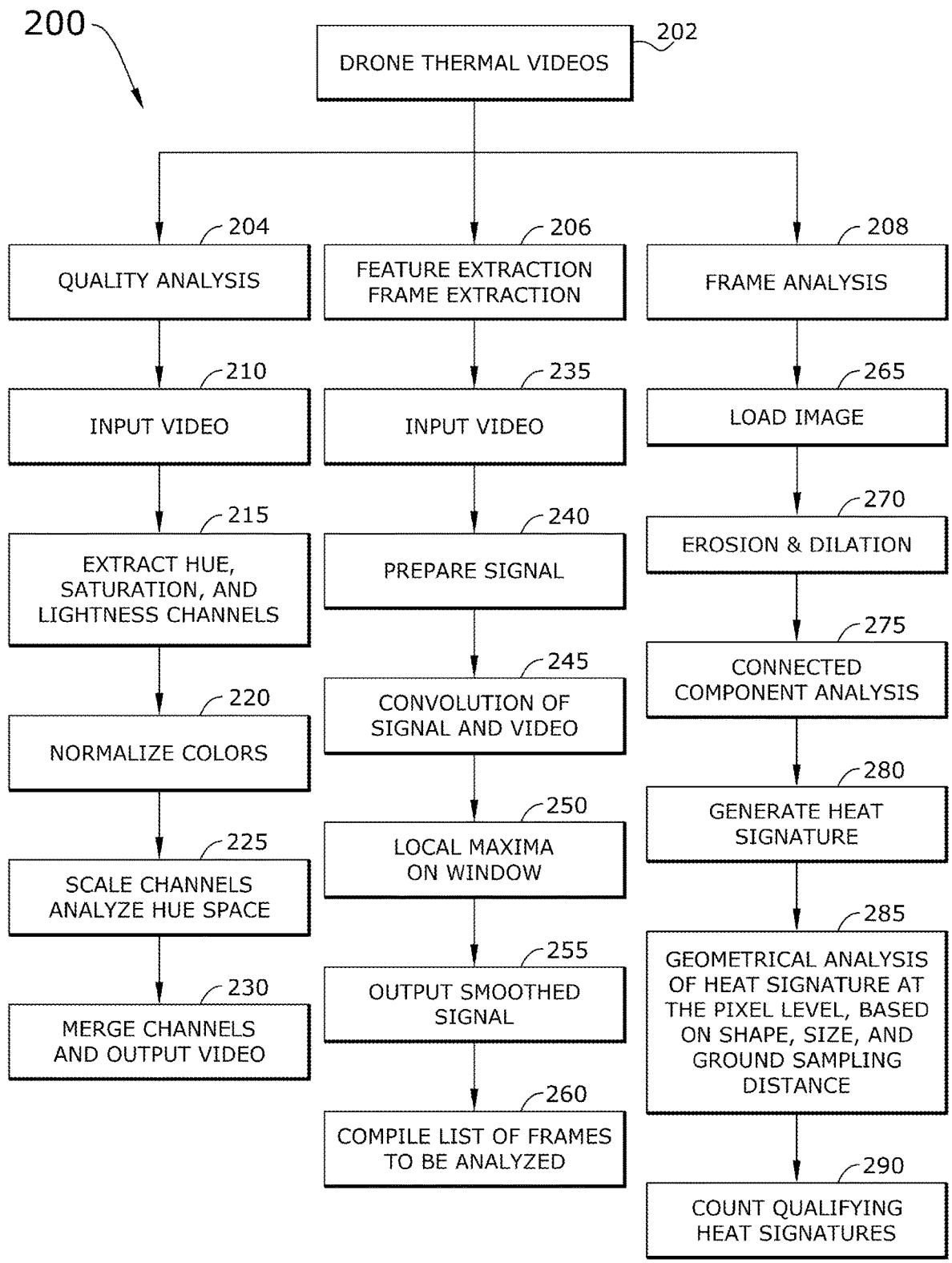
FIG. 2 conceptually illustrates drone video filtering, feature extraction, and analysis processing of the machine learning AI aerial wildlife survey and wounded game animal tracking process in some embodiments.

By way of example, FIG. 2 conceptually illustrates drone video filtering, feature extraction, and analysis processing of the machine learning AI aerial wildlife survey and wounded game animal tracking process for completing accurate aerial wildlife surveys by machine learning and AI-supported filtering of non-relevant information to count and report on specific targeted aspects of wildlife 200 in some embodiments. In some embodiments, the non-relevant information that is filtered includes one or more of trees, brush, localized heat from drone operation, etc. In some embodiments, the wildlife that is targeted is configured to any aspect the user intends to track, identify, count, or otherwise monitor over a land space. Examples of wildlife that are tracked, identified, etc., include, for example, tracking wounded game animals, performing general purpose wildlife surveys of a defined geographic space, etc.

In some embodiments, the drone video filtering, feature extraction, and analysis processing of the machine learning AI aerial wildlife survey and wounded game animal tracking process for completing accurate aerial wildlife surveys by machine learning and AI-supported filtering of non-relevant information to count and report on specific targeted aspects of wildlife 200 starts when drone thermal video is captured (at 202) and is ready for processing. While this example describes an aerial drone that captures thermal imagery, in some embodiments, the drone also captures a separate video stream of video in the human visual spectrum (i.e., the visible light spectrum for humans). The videos can be processed separately or in tandem (e.g., frame-by-frame comparison). In some cases, the separate videos may be composited as a single, combined video stream for further filtering and post-capture processing. In some embodiments, the drone video filtering, feature extraction, and analysis processing of the machine learning AI aerial wildlife survey and wounded game animal tracking process for completing accurate aerial wildlife surveys by machine learning and AI-supported filtering of non-relevant information to count and report on specific targeted aspects of wildlife 200 includes three separate processing modules that each include a plurality of sub-steps. The three separate processing modules include a quality analysis module that performs quality analysis (at 204), a feature and frame extraction module that extracts features and frames from captured videos (at 206), and a frame analysis module that analyzes thermal IR data and/or digital image data (at 208) in each frame (and/or each corresponding frame).

Starting with quality analysis (at 204), the quality analysis module first inputs the video (at 210). Next, the quality analysis module extracts hue, saturation, and lightness channels from the video (at 215). Then the quality analysis module normalizes colors (at 220) between the extracted channels. Specifically, normalizing colors by the quality analysis module involves analyzing color between the hue channel, the saturation channel, and the lightness channel, and then normalizing across these separate channels. After normalizing colors between the extracted channels, the quality analysis module moves forward by scaling the separate, extracted channels and analyzing hue space (at 225). Finally, the quality analysis module merges the separate, extracted channels and outputs the resulting video (at 230). After performing quality analysis of the thermal IR video data, the resulting video output (the "quality analyzed video") is used as input video by the feature and frame extraction module, described next.

The feature and frame extraction module, which extracts features and frames from captured videos (at 206), starts by inputting the quality analyzed video (at 235). The feature and frame extraction module then prepares a signal (at 240) for the quality analyzed video. Convolution of the signal and the quality analyzed video (at 245) is then performed by the feature and frame extraction module. Next, the feature and frame extraction module identifies a local maxima in the window (at 250) from the convolution step. Then the feature and frame extraction module outputs a smoothed signal (at 255). Finally, the feature and frame extraction module compiles a list of frames to be analyzed (at 260) by the frame analysis module. The list of frames, along with the quality analyzed video, are passed along to the frame analysis module, which is described next.

Upon receiving the list of frames, the frame analysis module analyzes thermal IR data and/or digital image data on a frame by frame basis. Thus, the frame analysis module starts by loading an image (at 265) of the first frame in the list. The frame analysis module performs erosion and dilation (at 270) on the image data of the frame and then performs a connected component analysis (at 275). This allows the frame analysis module to generate a heat signature (at 280) so that a geometrical analysis of the heat signature can be performed at the pixel level of the image (at 285), which is based on the shape, size, and ground sampling distance. Finally, the frame analysis module counts the qualifying heat signatures (at 290) which may indicate an animal. The frame analysis module then repeats the steps of this process for the next image in the list of frames, and so on, until all of the images in the list of frames have been analyzed.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash storage (such as USB flash drives or SD flash memory modules), RAM chips, hard drives (including solid state storage devices "SSD"), EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 3:
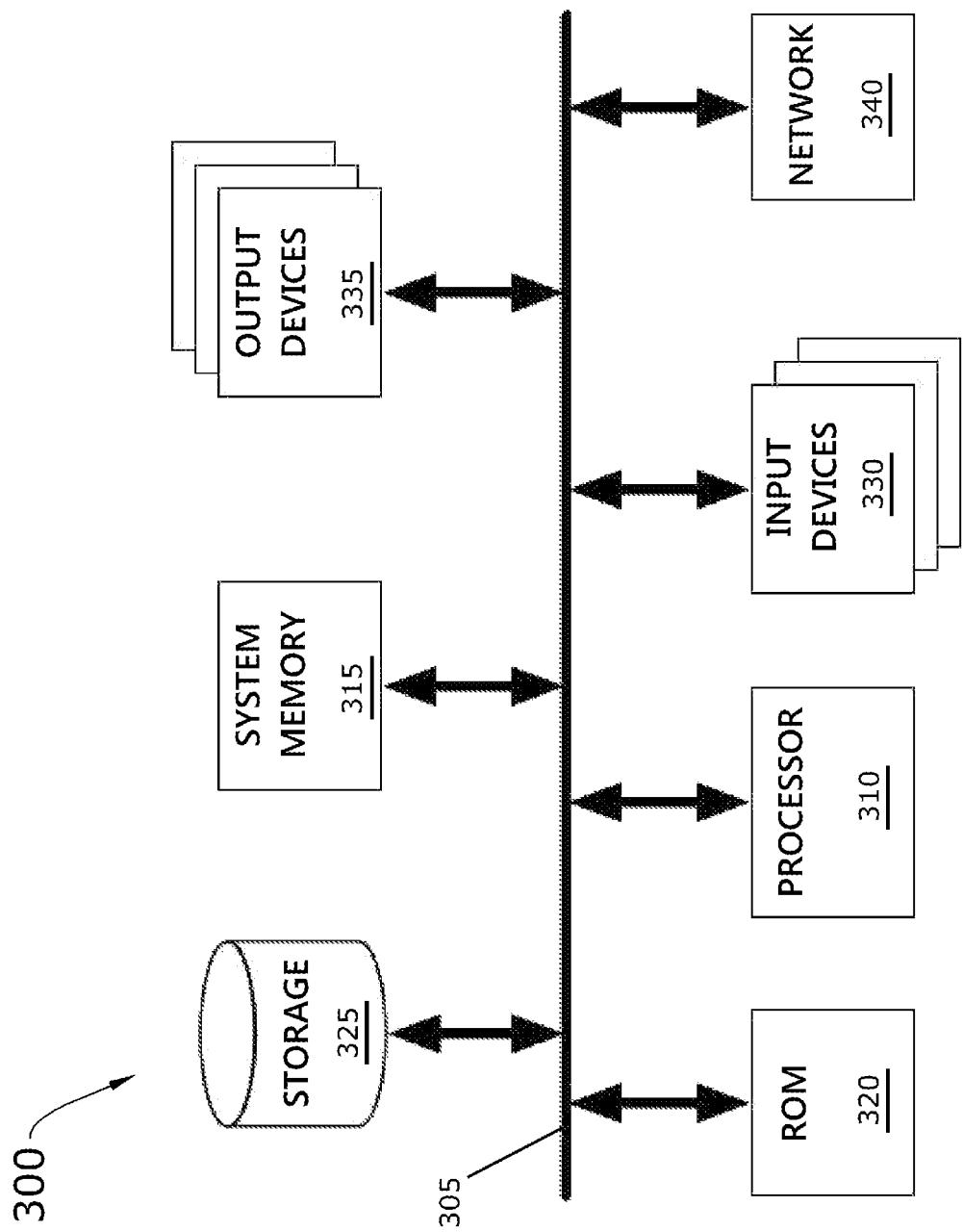
FIG. 3 conceptually illustrates an electronic system with which some embodiments of the invention are implemented.

FIG. 3 conceptually illustrates an electronic system 300 with which some embodiments of the invention are implemented. The electronic system 300 may be a computer, phone (cell phone, mobile phone, smartphone, etc.), PDA (iPod, other handheld computing device, etc.), tablet computing device, smartwatch, smart camera, onboard drone computing device, or any other sort of electronic device or computing device. Such an electronic system includes various types of computer readable media and interfaces for various other types of computer readable media. Electronic system 300 includes a bus 305, processing unit(s) 310, a system memory 315, a read-only memory 320, a permanent storage device 325, input devices 330, output devices 335, and a network 340.

The bus 305 collectively represents all system, peripheral, and chipset buses that communicatively connect the numerous internal devices of the electronic system 300. For instance, the bus 305 communicatively connects the processing unit(s) 310 with the read-only memory 320, the system memory 315, and the permanent storage device 325.

From these various memory units, the processing unit(s) 310 retrieves instructions to execute and data to process in order to execute the processes of the invention. The processing unit(s) may be a single processor or a multi-core processor in different embodiments.

The read-only-memory (ROM) 320 stores static data and instructions that are needed by the processing unit(s) 310 and other modules of the electronic system. The permanent storage device 325, on the other hand, is a read-and-write memory device. This device is a non-volatile memory unit that stores instructions and data even when the electronic system 300 is off. Some embodiments of the invention use a mass-storage device (such as a magnetic or optical disk and its corresponding disk drive) as the permanent storage device 325.

Other embodiments use a removable storage device (such as a floppy disk or a flash drive) as the permanent storage device 325. Like the permanent storage device 325, the system memory 315 is a read-and-write memory device. However, unlike storage device 325, the system memory 315 is a volatile read-and-write memory, such as a random access memory. The system memory 315 stores some of the instructions and data that the processor needs at runtime. In some embodiments, the invention's processes are stored in the system memory 315, the permanent storage device 325, and/or the read-only memory 320. For example, the various memory units include instructions for processing appearance alterations of displayable characters in accordance with some embodiments. From these various memory units, the processing unit(s) 310 retrieves instructions to execute and data to process in order to execute the processes of some embodiments.

The bus 305 also connects to the input and output devices 330 and 335. The input devices enable the user to communicate information and select commands to the electronic system. The input devices 330 include alphanumeric keyboards and pointing devices (also called "cursor control devices"). The output devices 335 display images generated by the electronic system 300. The output devices 335 include printers and display devices, such as liquid crystal displays (LCD) or organic light emitting diode (OLED) displays. Some embodiments include devices such as a touchscreen that functions as both input and output devices.

Finally, as shown in FIG. 3, bus 305 also couples electronic system 300 to a network 340 through a network adapter (not shown). In this manner, the computer can be a part of a network of computers (such as a local area network ("LAN"), a wide area network ("WAN"), or an intranet), or a network of networks (such as the Internet). Any or all components of electronic system 300 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General purpose and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, machine-readable storage media, or simply as media). The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, the machine learning AI aerial wildlife survey and wounded game animal tracking process of the present disclosure can be adapted for use in counting and recognizing people for the military. Another alternative application of the machine learning AI aerial wildlife survey and wounded game animal tracking process would be in search and rescue missions for first responders as well as for police chases in search of criminals on the run. Also, FIGS. 1 and 2 conceptually illustrate processes in which the specific operations of each process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

I claim:

1. A machine learning artificial intelligence ("AI") aerial wildlife survey and wounded game animal tracking process for completing accurate aerial wildlife surveys and tracking wounded game animals by machine learning and AI-supported filtering of non-relevant information comprising:

capturing thermal infrared ("IR") video data of a geographical area by an onboard camera of an aerial drone;

performing quality analysis of the thermal IR video data by (i) inputting, by a quality analysis module of a video data processing computing device, the thermal IR video data captured by the onboard camera of the aerial drone, (ii) extracting, by the quality analysis module of the video data processing computing device, hue, saturation, and lightness channels from the thermal IR video data, (iii) normalizing colors, by the quality analysis module of the video data processing computing device, between the hue channel, the saturation channel, and the lightness channel, (iv) scaling, by the quality analysis module of the video data processing computing device, the extracted channels, (v) analyzing, by the quality analysis module of the video data processing computing device, hue space of the scaled channels, and (vi) merging, by the quality analysis module of the video data processing computing device, the channels into a single composite quality analyzed video;

outputting the quality analyzed video after performing quality analysis of the thermal IR video data;

inputting the quality analyzed video to perform feature and frame extraction;

compiling and outputting a list of frame to be analyzed in the quality analyzed video after feature and frame extraction is completed;

receiving the list of frames to be analyzed;

loading each image that corresponds to a listed frame in the list of frames;

performing frame analysis of each loaded image to generate heat signatures that qualify objects in the image as one of an animal and a non-animal object; and counting the qualifying heat signatures in an aerial wildlife survey covering the geographical area.

2. The machine learning AI aerial wildlife survey and wounded game animal tracking process of claim 1, wherein performing feature and frame extraction of the quality analyzed video comprises:

preparing a signal with respect to the quality analyzed video;

performing a convolution of the signal and the quality analyzed video;

identifying a local maxima in a window based on the convolution; and outputting a smoothed signal.

3. The machine learning AI aerial wildlife survey and wounded game animal tracking process of claim 1, wherein performing frame analysis of each loaded image to generate heat signatures that qualify objects in the image as one of an animal and a non-animal object comprises:

performing erosion and dilation of the loaded image;

performing a connected component analysis after erosion and dilation;

generating a heat signature for the loaded image; and performing a geometrical analysis of the heat signature at a pixel level of the loaded image.

4. The machine learning AI aerial wildlife survey and wounded game animal tracking process of claim 1, wherein a geometrical analysis is based on shape, size and ground sampling distance associated with the loaded image.

5. A non-transitory computer readable medium storing a program which, when executed by a processor of a computing device, completes a machine learning and artificial intelligence ("AI") aerial wildlife survey of an area, said program comprising sets of instructions for:

capturing video data by an onboard camera of an aerial drone, wherein the captured video data comprises a plurality of sequentially framed images, wherein the captured video data further comprises both (i) digital video data that is captured in the visible light spectrum of colors visible to human eyes and (ii) thermal infrared ("IR") video data;

reducing the dimensions of the images in the plurality of sequentially framed images;

graying and blurring each image in the plurality of sequentially framed images;

identifying potential targets in each image after graying and blurring, wherein the potential targets comprise objects and animals;

identifying a size of each identified potential target;

breaking down the digital video data and the thermal IR video data into individualized digital video frames and individualized thermal IR video frames;

matching the individualized digital video frames to the individualized thermal IR video frames based on time synchronization;

comparing the images in the individualized digital video frames to the images in the individualized thermal IR video frames, on a frame-by-frame basis, after identifying the size of each identified potential target;

counting a number of objects and animals; and providing the count of the number of object and the number of animals as data results.

6. A machine learning artificial intelligence ("AI") aerial wildlife survey and wounded game animal tracking process for completing accurate aerial wildlife surveys and tracking wounded game animals by machine learning and AI-supported filtering of non-relevant information comprising:

capturing thermal infrared ("IR") video data of a geographical area by an onboard camera of an aerial drone;

performing quality analysis of the thermal IR video data;

outputting a quality analyzed video after performing quality analysis of the thermal IR video data;

inputting the quality analyzed video to perform feature and frame extraction;

compiling and outputting a list of frame to be analyzed in the quality analyzed video after feature and frame extraction is completed;

receiving the list of frames to be analyzed;

loading each image that corresponds to a listed frame in the list of frames;

performing frame analysis of each loaded image to generate heat signatures that qualify objects in the image as one of an animal and a non-animal object by (i) performing erosion and dilation of the loaded image, (ii) performing a connected component analysis after erosion and dilation, (iii) generating a heat signature for the loaded image, and (iv) performing a geometrical analysis of the heat signature at a pixel level of the loaded image; and counting the qualifying heat signatures in an aerial wildlife survey covering the geographical area.

7. The machine learning AI aerial wildlife survey and wounded game animal tracking process of claim 6, wherein performing quality analysis of the thermal IR video data comprises:

inputting, by a quality analysis module of a video data processing computing device, the thermal IR video data captured by the onboard camera of the aerial drone;

extracting, by the quality analysis module of the video data processing computing device, hue, saturation, and lightness channels from the thermal IR video data;

normalizing colors, by the quality analysis module of the video data processing computing device, between the hue channel, the saturation channel, and the lightness channel;

scaling, by the quality analysis module of the video data processing computing device, the extracted channels;

analyzing, by the quality analysis module of the video data processing computing device, hue space of the scaled channels; and merging, by the quality analysis module of the video data processing computing device, the channels into a single composite video for the quality analyzed video.

8. The machine learning AI aerial wildlife survey and wounded game animal tracking process of claim 6, wherein performing feature and frame extraction of the quality analyzed video comprises:

preparing a signal with respect to the quality analyzed video;

performing a convolution of the signal and the quality analyzed video;

identifying a local maxima in a window based on the convolution; and outputting a smoothed signal.

9. The machine learning AI aerial wildlife survey and wounded game animal tracking process of claim 6, wherein a geometrical analysis is based on shape, size and ground sampling distance associated with the loaded image.

* * * * *